(No Model.)

E. SCHOUP.
NUT FOR SPLIT BOLTS.

No. 580,179. Patented Apr. 6, 1897.

WITNESSES:
N. Webster Schlater
Minnie E. Schlater

Emil Schoup   INVENTOR
BY Chapin & Denny
his ATTORNEYS.

UNITED STATES PATENT OFFICE.

EMIL SCHOUP, OF FORT WAYNE, INDIANA.

NUT FOR SPLIT BOLTS.

SPECIFICATION forming part of Letters Patent No. 580,179, dated April 6, 1897.

Application filed August 5, 1896. Serial No. 601,714. (No model.)

*To all whom it may concern:*

Be it known that I, EMIL SCHOUP, a citizen of the United States, residing at Fort Wayne, in the county of Allen, in the State of Indiana, have invented certain new and useful Improvements in Nuts for Split Bolts; and I do hereby declare that the following is a full, clear, and exact description of the invention, which will enable others skilled in the art to which it appertains to make and use the same, reference being had to the accompanying drawings, which form part of this specification.

My invention relates to improvements in nuts for split bolts.

In Letters Patent issued to me on the 23d day of June, 1896, I have described and claimed an improved drawer-pull and a split bolt therefor having separated prongs formed by folding a piece of spring metal upon itself, provided upon their upper and lower exterior surfaces with coincident serrated notches adapted to receive and secure a holding disk or nut thereon; and the object of my present invention is to provide a cheap, convenient, and secure removable holding-nut for use upon the notched prongs of the said bolt and adapted for an interlocking engagement therewith.

My invention consists of a nut having a rectangular central bolt-aperture having its sides so beveled that it can readily be placed in position on said bolt or removed therefrom and by a quarter-turn be firmly secured thereon and interlocked therewith.

The novel feature of my invention consists of the construction and arrangement of the bolt-aperture whereby the said nut is removable or replaceable at pleasure, and yet can be securely interlocked with the said bolt by giving the said nut a slight turn.

Similar reference-numerals indicate corresponding parts throughout the several views, in which—

Figure 1:
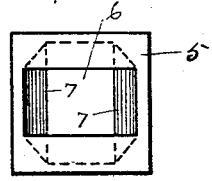
Figure 2:
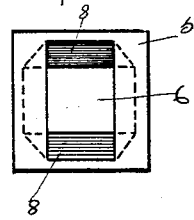
Figure 3:
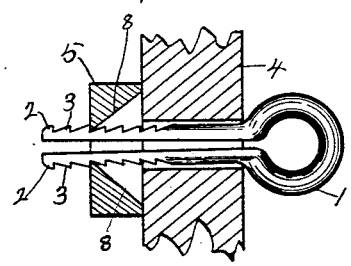
Figure 4:
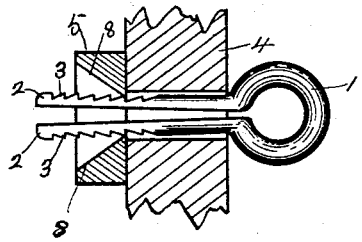
Figure 5:
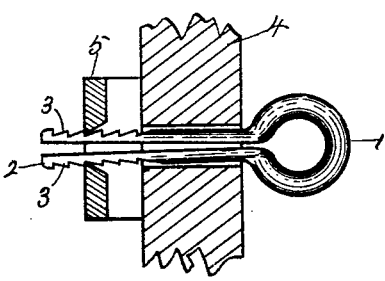
Figure 6:
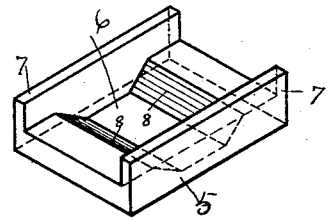

Figure 1 is a side view of my improved nut, showing two of the opposite beveled sides. Fig. 2 is a similar view of the reverse side of said nut, showing the other two opposite beveled sides. Fig. 3 is a view of a split bolt in position in a drawer shown in section, with my improvement in position thereon in vertical section to show the manner in which the beveled edges interlock therewith. Fig. 4 is a view in vertical section of my invention in position on a split bolt in position for removal therefrom. Fig. 5 is a view of a modified form of my improved nut in vertical section in position for a holding engagement. Fig. 6 is a perspective view of said modified form, showing the lateral flanges and the beveled edges upon the lower side thereof.

The bolt 1, preferably made of a single piece of spring metal, has an open head, as seen in Fig. 3, to secure a proper handle, and slightly-separated prongs 2, arranged in approximately parallel relation, having their inner and adjacent faces flattened and provided upon their outer faces with coincident transverse holding-notches 3, as shown, and is adapted to be mounted in a proper perforation in the drawer 4. Upon the free ends of the said notched prongs 2 my improvement is adapted to be detachably secured.

That form of my improved nut 5 shown in Figs. 1, 2, 3, and 4 has a central rectangular aperture 6, having its four sides equally beveled, with the opposite sides 7 flaring in a reverse direction from that of the opposite sides 8, whereby the said nut is reversible and whereby the greater length of the said aperture upon one side of said nut is at right angles with the greater length thereof upon the other side of said nut. To place my improvement in position for use, it is first so placed upon the free ends of the said prongs 2 that the beveled sides 8 will readily slip over the corresponding notched faces thereof until it is in the desired position against the said drawer 4, when it will be securely interlocked with said prongs, as seen in Fig. 3, and it will be in the position seen in Fig. 1. When it is desired to remove said nut from its interlocked engagement with the said bolt, it can readily be done by giving it a quarter turn or revolution in either direction, when it will assume the position shown in Figs. 2 and 4, after which the beveled edges 7 will readily slide over the said notched faces of the prongs 3.

It is obvious that the said nut is reversible and that the inner edges of the beveled faces 7 and 8 are each adapted for a locked engagement, but not simultaneously. The modified form of my improvement shown in Fig. 6 is provided upon two of its opposite sides with the vertical parallel flanges 7 and has upon the same side thereof the oppositely-beveled faces 8, whose inner edges are adapted for a locked engagement with the notches 3 of the prongs 2, as seen in Fig. 5. It is also provided with a central rectangular bolt-aperture 6, whose length is coincident with the interlocking edges of the beveled faces 8. This form of my improved nut is not reversible, but it is conveniently detachable by giving it a quarter-turn, after which the notches 3 of the said prongs will readily slide over the inner faces of the said flanges 7. To place this form of my improvement in position, it is so placed upon the free ends of the said notched prongs that the said beveled faces will be at right angles to the notched faces of the said prongs and the flanges 7 will be parallel therewith. The said nut can then readily be slipped over the said notches to the desired position adjacent to the drawer 4, when it can be interlocked with the said prongs by giving it a quarter-turn, as the holding edges of the said beveled faces will then engage the notches 3 of said prongs.

Having thus described my invention and the manner of employing the same, what I desire to secure by Letters Patent is—

1. A removable nut for split bolts having a central rectangular bolt-aperture whose adjacent sides are unequal, for the purpose specified, having opposite beveled faces provided with opposite holding edges adapted for an interlocking engagement with the notched edges of a split bolt, constructed and arranged substantially as described.

2. A reversible and removable holding-nut 5 having a rectangular bolt-aperture 6 whose adjacent sides are unequal provided with the beveled sides 7 and 8 whose inner edges are adapted for an interlocking engagement with the notched faces of a split bolt, substantially as described.

3. A removable nut for split bolts having parallel flanges 7 upon two opposite sides thereof, a centrally-arranged rectangular bolt-aperture 6 whose length is at right angles to the said flanges, and provided with the beveled or oblique faces 8 having their inner edges adapted for an interlocking engagement with said bolt, all substantially as described.

4. The combination of a split bolt having separated prongs, as shown, with the upper and under exterior surfaces provided with coincident serrated notches, adapted to secure an interlocking-nut, and a reversible and removable nut 5 having a rectangular bolt-aperture 6 whose adjacent sides are unequal, provided with the beveled sides 7 and 8 whose inner edges are adapted for an interlocking engagement with the notched faces of said bolt, substantially as described.

5. A removable nut for split bolts having parallel flanges upon two opposite sides thereof, a centrally-arranged rectangular bolt-aperture whose length is at right angles to the said flanges, and provided with the beveled or oblique faces 8 having their inner edges adapted for an interlocking engagement with said bolt; in combination with a split bolt having separated prongs, as shown, with the upper and under exterior surfaces provided with coincident serrated notches adapted to secure said nut, all substantially as described.

Signed by me at Fort Wayne, in the county of Allen and the State of Indiana, this 3d day of August, A. D. 1896.

EMIL SCHOUP.

Witnesses:
HENRY MILLS,
ALICE M. BENGNOT.